US010321138B2

(12) United States Patent
Ali

(10) Patent No.: US 10,321,138 B2
(45) Date of Patent: *Jun. 11, 2019

(54) ADAPTIVE VIDEO PROCESSING OF AN INTERACTIVE ENVIRONMENT

(71) Applicant: Microsoft Technology Licensing, LLC, Redmond, WA (US)

(72) Inventor: Walid Ali, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 914 days.

This patent is subject to a terminal disclaimer.

(21) Appl. No.: 14/457,007

(22) Filed: Aug. 11, 2014

(65) Prior Publication Data

US 2014/0348224 A1 Nov. 27, 2014

Related U.S. Application Data

(63) Continuation of application No. 12/239,137, filed on Sep. 26, 2008, now Pat. No. 8,804,821.

(51) Int. Cl.
*H04N 19/164* (2014.01)
*H04L 1/00* (2006.01)
(Continued)

(52) U.S. Cl.
CPC ......... *H04N 19/164* (2014.11); *H04L 1/0015* (2013.01); *H04L 12/1827* (2013.01); *H04N 7/15* (2013.01); *H04N 19/115* (2014.11); *H04N 19/166* (2014.11); *H04N 19/46* (2014.11); *H04N 19/513* (2014.11);
(Continued)

(58) Field of Classification Search
CPC . H04L 1/0009; H04L 1/0015; H04L 12/1827; H04N 7/15; H04N 21/2402; H04N 21/42203; H04N 21/4223; H04N 21/440263; H04N 21/44209; H04N 21/4788; H04N 19/513; H04N 19/60;
(Continued)

(56) References Cited

U.S. PATENT DOCUMENTS 5,151,784 A 9/1992 Lavagetto et al.
5,659,363 A 8/1997 Wilkinson
(Continued)

OTHER PUBLICATIONS

"Proposed Transport Protocol for Compressed AV Stream over Fibre Channel," Apr. 1998, Matsushita Electric Industrial Co., Ltd./Panasonic Broadcast & Television System Co., pp. 1-12, ftp://ftp.t11.org/t11/pub/fc/av/98-212v0.pdf.
(Continued)

*Primary Examiner* — Zhihan Zhou

(57) ABSTRACT

Embodiments are configured to provide interactive communication functionality including adaptive video processing functionality that can be used to process aspects of a video signal, but the embodiments are not so limited. In an embodiment, components of a video conferencing system can operate to provide a video signal based in part on the use of adaptive processing features which include scaling and/or other pixel processing features. In one embodiment, components of an interactive video system can operate to adaptively manage and control video payload parameters to adapt to various communication conditions associated with a real-time or near-real time interactive video environment.

19 Claims, 13 Drawing Sheets

(51) Int. Cl.

| | | |
|---|---|---|
| *H04L 12/18* | (2006.01) | |
| *H04N 7/15* | (2006.01) | |
| *H04N 21/24* | (2011.01) | |
| *H04N 21/422* | (2011.01) | |
| *H04N 21/4223* | (2011.01) | |
| *H04N 21/4402* | (2011.01) | |
| *H04N 21/442* | (2011.01) | |
| *H04N 21/4788* | (2011.01) | |
| *H04N 19/46* | (2014.01) | |
| *H04N 19/115* | (2014.01) | |
| *H04N 19/166* | (2014.01) | |
| *H04N 19/513* | (2014.01) | |
| *H04N 19/60* | (2014.01) | |

(52) U.S. Cl.
CPC ......... *H04N 19/60* (2014.11); *H04N 21/2402* (2013.01); *H04N 21/4223* (2013.01); *H04N 21/42203* (2013.01); *H04N 21/44209* (2013.01); *H04N 21/440263* (2013.01); *H04N 21/4788* (2013.01); *H04L 1/0009* (2013.01)

(58) Field of Classification Search
CPC .... H04N 19/164; H04N 19/46; H04N 19/115; H04N 19/166
USPC .................................................... 375/240.02
See application file for complete search history.

(56) References Cited

U.S. PATENT DOCUMENTS

| | | | |
|---|---|---|---|
| 5,699,369 | A | 12/1997 | Guha |
| 5,889,791 | A | 3/1999 | Yang |
| 6,091,777 | A | 7/2000 | Guetz et al. |
| 6,466,624 | B1 | 10/2002 | Fogg |
| 6,477,669 | B1 | 11/2002 | Agarwal et al. |
| 6,553,072 | B1 | 4/2003 | Chiang et al. |
| 6,728,317 | B1 | 4/2004 | Demos |
| 6,961,890 | B2 | 11/2005 | Smith |
| 7,058,721 | B1 | 6/2006 | Ellison et al. |
| 7,984,179 | B1* | 7/2011 | Huang ............... H04N 21/2662 709/231 |
| 8,243,117 | B2 | 8/2012 | Ali et al. |
| 8,804,821 | B2 | 8/2014 | Ali |
| 2002/0021842 | A1* | 2/2002 | Lee ....................... G06F 17/147 382/233 |
| 2003/0135865 | A1 | 7/2003 | Jung |
| 2003/0149971 | A1 | 8/2003 | Basil et al. |
| 2003/0152032 | A1 | 8/2003 | Yanagihara et al. |
| 2003/0156645 | A1* | 8/2003 | Cohen ................. H04N 19/139 375/240.16 |
| 2003/0161321 | A1 | 8/2003 | Karam et al. |
| 2004/0017773 | A1 | 1/2004 | Piche et al. |
| 2004/0022322 | A1 | 2/2004 | Dye |
| 2005/0039211 | A1 | 2/2005 | Washino |
| 2005/0053136 | A1 | 3/2005 | Yu et al. |
| 2006/0104365 | A1 | 5/2006 | Li et al. |
| 2006/0146934 | A1* | 7/2006 | Caglar ............. H04N 21/23406 375/240.12 |
| 2006/0291475 | A1* | 12/2006 | Cohen .................. H04L 1/0041 370/395.42 |
| 2007/0005804 | A1 | 1/2007 | Rideout |
| 2007/0044005 | A1 | 2/2007 | Amram et al. |
| 2007/0047650 | A1* | 3/2007 | Vilei .................... H04N 19/172 375/240.16 |
| 2007/0094580 | A1 | 4/2007 | Livshitz |
| 2007/0189401 | A1* | 8/2007 | Watson ............... H03M 13/373 375/259 |
| 2008/0069242 | A1 | 3/2008 | Xu et al. |
| 2008/0075163 | A1 | 3/2008 | Brydon et al. |
| 2008/0109865 | A1 | 5/2008 | Su et al. |
| 2008/0117819 | A1 | 5/2008 | Flott et al. |
| 2008/0151776 | A1 | 6/2008 | Kure |
| 2008/0165864 | A1 | 7/2008 | Eleftheriadis et al. |
| 2008/0225735 | A1* | 9/2008 | Qiu ........................ H04L 1/0009 370/252 |
| 2008/0263621 | A1* | 10/2008 | Austerlitz ........ H04N 21/43615 725/139 |
| 2008/0303895 | A1* | 12/2008 | Akka .................. H04N 13/0048 348/49 |
| 2009/0067495 | A1 | 3/2009 | Au et al. |
| 2009/0073006 | A1 | 3/2009 | Wegener |
| 2009/0116562 | A1 | 5/2009 | Eleftheriadis |
| 2009/0154495 | A1* | 6/2009 | Ojala .................... H04L 1/0083 370/469 |
| 2010/0079575 | A1 | 4/2010 | Ali et al. |

OTHER PUBLICATIONS

"The Evolution of Video Conferencing: UltimateHD," 2006, Polycom, Inc., pp. 1-6, http://www.polycom.com.fr/common/documents/whitepapers/evolution_of_video_conferencing_ultimate_hd.pdf.

Ding, Gang, et al., "Error Resilient Video Transmission over Wireless Networks," Mar. 5, 2003, Purdue University, pp. 1-4, http://raidlab.cs.purdue.edu/papers/VideoWireless.pdf.

Johanson, Mathias, "Adaptive Forward Error Correction for Real-Time Internet Video," Apr. 2003, Alkit Communications, pp. 1-8, http://w2.alkit.se/~mathias/doc/PV2003-paper.pdf.

Malik, Rajiv, et al., "Adaptive Forward Error Correction (AFEC) Based Streaming Using RTSP and RTP," Feb. 2006, Advanced International Conference on Telecommunications and International Conference on Internet and Web Applications and Services, pp. 1-6, http://ieeexplore.ieee.org/iel5/10670/33674/01602192.pdf?arnumber=1602192.

Mehaoua, Ahmed, et al., "Proposal of An AudioVisual SSCS with Forward Error Correction," Jul. 1999, University of Cambridge, University of Toronto, University of Versailles, pp. 121-127, http://ieeexplore.ieee.org/iel5/6339/16947/00780783.pdf?tp=&isnumber=&arnumber=780783.

Pillai, Radhakrishna, et al., "A Forward Error Recovery Technique for Real-Time MPEG-2 Video Transport and its Performance Over Wireless IEEE 802.11 LAN," Oct. 2000, Kent Ridge Digital Labs, National University of Singapore, pp. 497-502, http://ieeexplore.ieee.org/iel5/7110/19149/00885535.pdf?arnumber=885535.

Office Action dated Jan. 18, 2012, in co-pending U.S. Appl. No. 12/238,981.

Notice of Allowance dated May 9, 2012, in co-pending U.S. Appl. No. 12/238,981.

Corrected Notice of Allowability dated Jun. 25, 2012, in co-pending U.S. Appl. No. 12/238,981.

* cited by examiner

FIGURE 10A

RTVideo Basic RTP Payload Format

| 0 1 2 3 4 5 6 7 8 9 0 1 2 3 4 5 6 7 8 9 0 1 2 3 4 5 6 7 8 9 0 1 | | | | | | | |
|---|---|---|---|---|---|---|---|
| M | C | SP | L | O | I | S | F |
| Sequence Header Length (optional) | | | | Sequence Header Bytes (variant length) | | | |

FIGURE 10B

RTVideo Extended RTP Payload Format

| 0 1 2 3 4 5 6 7 8 9 0 1 2 3 4 5 6 7 8 9 0 1 2 3 4 5 6 7 8 9 0 1 | | | | | | | | | | | |
|---|---|---|---|---|---|---|---|---|---|---|---|
| M | C | SP | L | O | I | S | F | M2 | HiRF C | HiF C | DV E |
| Sequence Header Length (optional) | | | | FrameCounter | | | | RefFrameCounter | | | |
| Sequence Header Bytes (length varies) | | | | | | | | | | | |

FIGURE 10C

Payload, FEC, and

| 0 1 2 3 4 5 6 7 8 9 0 1 2 3 4 5 6 7 8 9 0 1 2 3 4 5 6 7 8 9 0 1 | | | | | | | | | | | |
|---|---|---|---|---|---|---|---|---|---|---|---|
| M | C | SP | L | O | I | S | F | M2 | HiRF C | HiF C | DV E |
| FrameCounter | | | | | | | | RefFrameCounter | | | |
| M3 | HiP N | Reserved | | | PacketNumberLo | | | | HiLPL | EndOffset | LastPacketLengthLo |

ADAPTIVE VIDEO PROCESSING OF AN INTERACTIVE ENVIRONMENT

CROSS REFERENCE TO RELATED APPLICATION

This application is a continuation of application Ser. No. 12/239,137, filed Sep. 26, 2008, and now assigned U.S. Pat. No. 8,804,821, which is incorporated herein by reference in its entirety.

This application is related to U.S. patent application Ser. No. 12/238,981, filed Sep. 26, 2008, entitled, "Processing Aspects of a Video Scene", now U.S. Pat. No. 8,243,117 which is incorporated herein by reference in its entirety.

BACKGROUND

Video processing technology is used to provide video conferencing and other interactive environments. For example, video conferencing systems can be used to enable interactions between two or more participants at remote locations. Real-time video transmission in network environments, such as in a wireless network or using the Internet for example, can be vulnerable to various networking conditions (e.g., jitter, packet losses, congestion, etc.). Signal processing techniques are used in attempts to compensate for certain unfavorable network and other communication conditions to try and enhance the user experience while participating in a video conference.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are configured to provide interactive communication functionality including using adaptive video processing functionality that can be used to process aspects of a video signal, but the embodiments are not so limited. In an embodiment, components of a video conferencing system can operate to provide a video signal based in part on the use of adaptive processing features which include scaling and/or other pixel processing features. In one embodiment, components of an interactive video system can operate to adaptively manage and control video payload parameters to adapt to various communication conditions associated with a real-time or near-real time interactive video environment.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIGS. 10A-10C depict exemplary video packet architectures.

DETAILED DESCRIPTION

Figure 1:
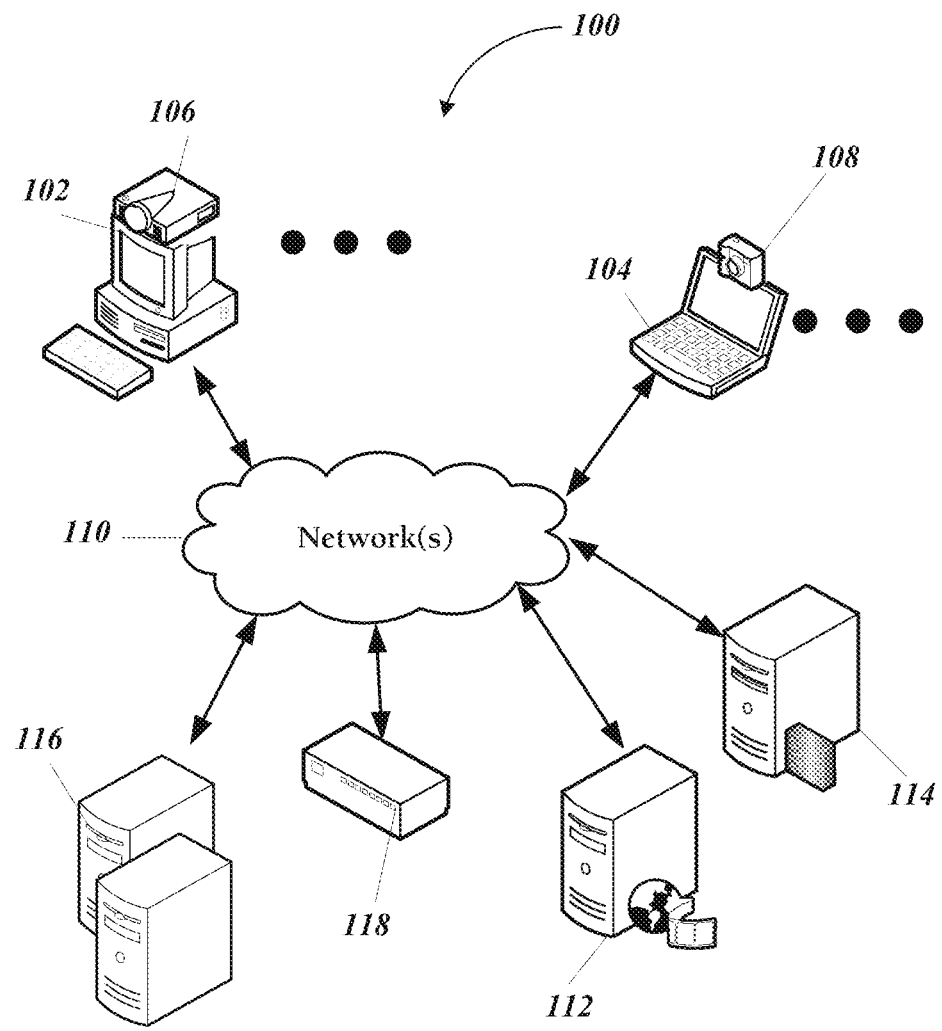
FIG. 1 is a block diagram illustrating an exemplary video conferencing system.

Various embodiments can be configured to provide an interactive video environment to one or more communication participants, but are not so limited. For example, hardware, software, memory, processing, and/or other resources can be used to provide video conferencing functionality that can be used to automatically adapt to different network conditions. Video processing and other features can be used to manage and control video processing operations as part of providing an interactive video environment to one or more communicating participants. The various embodiments can be used in a variety of communication environments and are not limited to any particular communication architecture and/or component functionality.

In an embodiment, components of a video conferencing system can operate to process a video signal based in part on the use of adaptive and other processing features associated with a video processing pipeline. For example, components of real-time or near-real time video conferencing system can be configured to control aspects of a video payload and/or a video processing pipeline to adapt to varying network and/or other communication conditions. In one embodiment, components of an interactive video system can be configured to adaptively control scaling and/or quantization operations to compensate for and adapt to various network conditions associated with a real-time or near-real time interactive video conferencing environment.

In another embodiment, a video conferencing system can provide an interactive environment by using adaptive video processing features to provide a video signal. In one embodiment, components of an interactive video system can use adaptive payload control (APC) operations, in conjunction with forward error correction (FEC) features to adjust to various network conditions associated with a real-time or near-real time interactive video environment. For example, based in part on conditions of communication architecture (e.g., jitter, losses, etc.), components of the interactive video system can operate to produce a compact bit stream, control video quality, and/or a level of payload protection.

In another embodiment, a video conferencing device can be used to transmit and/or receive a video stream associated with a video conferencing environment. The video conferencing device can include a pre-processing component and/or a post-processing component, but is not so limited. The pre-processing component can be used to process a captured video signal before transmitting the pre-processed signal over a communication channel. For example, the pre-processing component can operate to scale pixel data and provide a pre-processed signal to an encoder for encoding operations. The post-processing component can be used to process a received signal transmitted over a communication channel. As an example, the post-processing component can operate to scale aspects of a decoded signal to provide a post-processed signal.

According to various embodiments, a video conferencing device can include additional components, configurations, and/or functionality. For example, a video conferencing device can include: pre- and/or post-processing components, range compression components, motion estimation components, transform/inverse transform components, quantization/de-quantization components, de-blocking components, reference components, prediction components, variable-length coding components, and/or other components. A video conferencing device can operate to process a video and/or audio stream which can be used by one or more conference participants. For example, the video conferencing device can use pre and post processing operations, buffer management techniques, estimated distortion heuristics, quality impact techniques, inter/intra prediction optimizations, etc. to process a video stream or signal. A video signal can be displayed or stored in memory for subsequent use.

In yet another embodiment, components of a video conferencing system can include a pre-processing application that includes down-scaling functionality and/or a post-processing application that includes up-scaling functionality. The applications include executable instructions which, when executed, operate on pixel data to process aspects of a video stream, but is not so limited. For example, a video conferencing system or device can use the pre-processing application to prepare a signal for transmission, and/or use the post-processing application as part of processing a received signal. Video conferencing devices, cameras, and other devices/systems can use the pre-processing and/or post-processing functionality described below.

While various embodiments describe components and functionality associated with video conferencing systems, the embodiments are not so limited and the principles and techniques described herein can be applied to other video and interactive systems. Network-based conferences combining various forms of communication such as audio, video, instant messaging, application sharing, and/or data sharing also may be facilitated using principles described herein. Other embodiments are available.

FIG. 1 is a diagram depicting an exemplary video conferencing system 100. The video conferencing system includes a network (e.g., network 110) or networks enabling a number of participants with video transmission and reception capability to communicate with one another over the network 110. Each participant device 102, 104 can include any computing device with audio/video capability such as a desktop, laptop computer, or other computing/communication device having a camera, microphone, speaker, display and/or video conferencing equipment.

As shown in FIG. 1, device 102 includes a camera 106 and device 104 also includes a camera 108. Cameras 106, 108 and other capture devices/systems can be used to provide video and other signals that can be used as part of an interactive video environment. As described below, pre-processing and/or post-processing features can be used to process captured pixel data irrespective of the mechanism or method used to capture the pixel data. For example, a video camera can be used to capture actions of one or more video conference participants at a designated frame rate (e.g., 15 frames/sec, 30 frames/sec, etc.) as part of a red-green-blue (RGB), YUV, or some other pixel format. Cameras 106, 108 can be separate components or video capture functionality can be integrated with device 102 and/or device 104. For example, a video camera or other optical device can be wirelessly coupled or directly wired ((e.g., Universal Serial Bus (USB), Peripheral Component Interface (PCI), etc.) to an associated video conferencing device and used to capture participant interactions.

Correspondingly, the video conferencing system 100 can include computing/communication devices having video capture functionality and associated video processing features. Moreover, video conferencing system 100 can include a plurality of computing/communication devices and the associated video capture functionality. As described below, the system 100 can include pre-processing and/or post-processing functionality that can be used to process pixel data as part of providing a video signal for display on an associated display. A video conferencing device can operate more efficiently by using the pre-processing and/or post-processing functionality to compensate for bandwidth and other communication constraints associated with a video conferencing environment.

As described below, pre-processed and/or post-processed signals can be communicated to one or more components of a video processing pipeline for further processing and use in providing a video stream to one or more video conferencing participants. In one embodiment, a captured frame can be pre-processed to provide scaled pixel data. The scaled pixel data can be communicated to an encoder for further processing. Correspondingly, a lower number of encoding operations are required since the scaled pixel data is less than a captured frame of pixel data. The encoded signal can be transmitted and a received signal can be decoded. The decoded signal can be post-processed to scale the pixel data on the receiving side for storage and/or display on an associated display.

With continuing reference to FIG. 1, network 110 can include any communication network or combination of networks. A video conference can be facilitated by a single device/program or by a combination of devices and programs. For example, audio/video server 112, firewall server 114, and/or mediation servers 116 can be included and used for different aspects of a conference, such as storage and processing of audio and/or video files, security, and/or interconnection of various networks for seamless communication between conference participants. Any of these example tasks and others may be performed by software, hardware, and/or a combination of hardware and software. Additionally, functionality of one or more servers can be further combined to reduce the number of components.

With continuing reference to FIG. 1, and as further example, a Multipoint Control Unit (MCU) 118 can be used as a primary facilitator of a video conference in coordination with one or more of other components, devices, and/or systems. MCU 118 may use various protocols such as Internet Protocol (IP) and variations thereof for example, and be structured as software program(s), hardware, or some combination thereof. MCU 118 can be implemented as a stand-alone hardware device, or embedded into dedicated conferencing devices (e.g., audio/video server 112, mediation servers 116, etc.). Additionally, MCU 118 can be implemented as a decentralized multipoint, where each station in a multipoint call exchanges video and audio directly with the other stations with no central manager.

Figure 2:
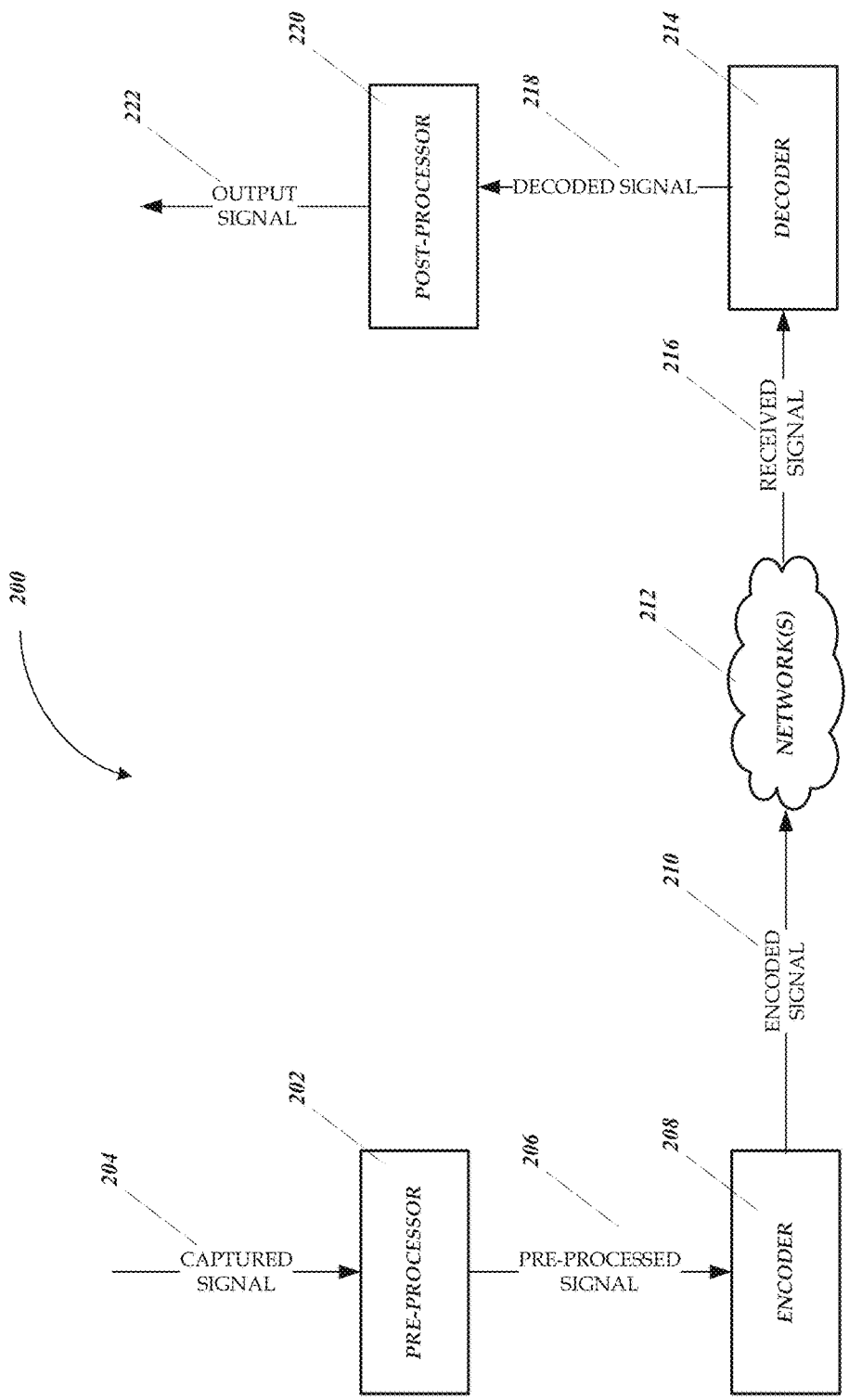
FIG. 2 is a block diagram illustrating an exemplary video conferencing system.

FIG. 2 is a block diagram depicting components of an exemplary video conferencing system 200. According to an embodiment, and as shown in FIG. 2, the system 200 includes a pre-processor 202 that can be configured to process pixel data associated with a captured signal 204. For example, a stand-alone video camera can be used to capture a video scene associate with a video conferencing environment and output a captured signal which consists of frames of pixel data. That is, each frame includes a number of pixels having associated pixel values (color, luminance, opacity, etc.). A video conferencing device (see FIG. 1) can include an associated video capture device that can operate to capture video and provide frames of pixel data.

The pre-processor 202 can operate to process the captured pixel data to provide a pre-processed signal 206 to an encoder 208, but is not so limited. As described below, fewer encoding operations can be required to encode captured pixel data since a captured frame of pixel data can be effectively reduced by providing fields of pixel data from the captured frame of pixel data. Additionally, bandwidth constraints can be compensated for since less pixel data is being transmitted with each encoded field. In one embodiment, the functionality of the pre-processor 202 can be included with the encoder 208 or some other component(s) (e.g., part of the signal capture device, etc.).

As described below, the pre-processor 202 can be configured to discard certain pixel data while retaining other pixel data associated with a given frame of pixel data to thereby reduce a number of processing operations of the encoder 208 when processing the pre-processed signal 206. In an embodiment, the pre-processor 202 can operate to discard a first group of pixels associated with a first frame of pixel data, resulting in a first field of pixel data that is a subset of the first frame of pixel data. The pre-processor 202 can operate to process the next frame of pixel data to discard a second group of pixels associated with the second frame of pixel data, resulting in a second field of pixel data that is a subset of the second frame of pixel data.

In one embodiment, the pre-processor 202 can operate to process a captured frame of pixel data by discarding or ignoring one or more of the even and/or odd rows or lines of a captured frame of pixel data to obtain a field of pixel data (e.g., if the odd rows (or lines) were discarded in the previous frame, then the even rows are discarded in the current frame, and vice versa). The pre-processor 202 can operate to process consecutive frames of captured pixel data to provide a plurality of fields of pixel data for further processing operations. As one result of the pre-processor 202 operations, the amount of pixel data can be reduced by some percentage (e.g., 80%, 50%, 25% etc.) in accordance with the amount of discarded pixel data to obtain an associated field of pixel data. Each field of pixel data can be described as being a subset of pixel data of an associated captured frame of pixel data.

For example, the pre-processor 202 can operate to discard all of the even rows of pixels associated with a first frame of captured pixel data (e.g., 352×288, etc.) to obtain a first field of pixel data (e.g., 352×144, etc.) and to thereby reduce the amount of pixel data to be processed which can alleviate bandwidth constraint and/or processing issues. Accordingly, the odd rows of pixel data can be communicated for further processing operations, by the encoder 208 for example. Continuing with the example, for the next frame of captured pixel data, the pre-processor 202 can operate to discard all of the odd rows of pixels to obtain a second field of pixel data (e.g., 352×144, etc.) associated with the next frame and to thereby reduce the amount of pixel data to be processed which can further alleviate bandwidth constraint and/or processing issues. Accordingly, the even rows of pixel data associated with this next frame can be communicated for further processing operations.

After pre-processing operations, the pre-processed signal 206 can be communicated to the encoder 208 and/or other component(s) for further processing. The encoder 208 can operate to encode the pre-processed signal 206 according to a desired encoding technique (e.g., VC-1, H261, H264, MPEG et al., etc.). The encoded signal 210 can be communicated over a communication medium, such as a communication channel of a communication network 212 to one or more conferencing participants. At the receiving side, a decoder 214 can operate to decode the received signal 216 which has been previously encoded by the encoder 208, but is not so limited. The decoder 214 uses decoding operations to decode the received signal 216 based in part on the type of encoding operations performed by the encoder 208. As shown in FIG. 2, the decoder 214 outputs a decoded signal 218 which can be input to a post-processor 220. In one embodiment, the functionality of the post-processor 220 can be included with the decoder 214 or some other component(s).

The post-processor 220 can operate to process the decoded signal 218 to provide a post-processed signal 222. The post-processed signal 222 can be stored in some dedicated storage or provided to a display device for display to one or more conference participants. As described below, the post-processor 220 can be configured to reconstruct a captured frame of pixel data by using fields of pixel data to determine pixel values for the reconstructed frame. In an embodiment, the post-processor 220 can operate to process consecutive or other associated fields of pixel data to reconstruct a frame of pixel data.

In one embodiment, the post-processor 220 can use a first group of pixels associated with a first field of pixel data and a second group of pixels associated with a second field of pixel data to reconstruct pixel data associated with a captured frame of pixel data. For example, the post-processor 220 can operate to process consecutive fields (e.g., odd and even fields) of pixel data to reconstruct a frame of pixel data which can be displayed on an associated display. As an example of the functionality of the post-processor 220, assume that a first field of pixel data includes all of the even rows of pixels of an associated frame. That is, the first field does not include pixel data for the odd rows of pixels (e.g., all pixel values in an odd row have been previously discarded or set to zero).

Continuing with the example, to reconstruct the associated frame, the post-processor 220 can use an adjacent field of pixel data (e.g., stored in a buffer or other memory) for the odd rows (e.g., having pixel values) to determine a value for each pixel value of the odd rows to include with the even row of pixel data for the reconstructed frame. In one embodiment, the post-processor 220 can operate to determine a pixel value of a reconstructed frame by multiplying each pixel value of a column of pixel values by an associated weight or weighting factor and summing the resulting weighted pixel values to obtain the pixel value associated with the reconstructed frame. For example, a value of a pixel of an odd row can be calculated by multiplying certain pixel values (even and odd rows) of the associated column with one or more associated weights.

In an embodiment, pixel values of select rows of a given column of a prior field can be used in conjunction with pixel values of select rows of a given column of a current field to calculate a pixel value for a reconstructed frame by multiplying the plurality of pixel values by a number of weights or weighting factors and adding the weighted values together. Correspondingly, the post-processor 220 can operate to determine certain pixel values for inclusion in a reconstructed frame. The post-processor 220 can also be configured to evaluate motion vector information pixel by pixel, group of pixels by group of pixels, etc. for a prior frame and a current frame, and adjust a weight or weights based in part on the motion vector information. As described below, the weight or weights can be used to determine certain pixel values for inclusion in the reconstructed frame.

For example, assume that the post-processor 220 is determining a value of a pixel of an odd row since a decoded signal 218 includes pixel values of a field of even rows (the current field here) for the reconstructed frame being processed. For this example, the post-processor 220 can multiply pixel values of adjacent odd rows of a prior field by weights, multiply pixel values of select even rows of the current field by weights, and add the weighted values together to determine a pixel value for the reconstructed frame. In one embodiment, the weights can be based in part on characteristics of motion vector parameters output by the encoder 208.

That is, motion vectors and other information from a prior or current field can be used in part to determine a pixel value for a reconstructed frame since the first and second fields are spaced apart in time as being based on different captured frames of pixel data. For example, the encoder 208 or other component can operate to provide motion vector information associated with a macroblock (e.g., 16×16, 8×8, etc.), a subset of pixels, and/or a pixel. In one embodiment, the weights or weighting factors can be based in part on information of motion vectors associated with a particular macro block or subset of pixels. The weights can be tuned to provide a desired amount of video quality. For example, if there is a large disparity between motion vector values of one frame and a prior frame, an associated weight or weights can be lowered in attempting to account for the disparity. If this is the case, a weighted pixel value may provide less of a contribution to the overall calculated pixel value due in part to the motion vector information. On the other hand, if the motion vector(s) vary by a minimal amount (a threshold can be configured according to a preferred functionality), an associated weight or weights can be increased to account for the similar motion content. Moreover, if the difference in the motion vectors are zero, the post-processor 220 can use the maximum weight or weights for the associated pixel values.

The example equation below can be used by the post-processor 220 to calculate one or more pixel values for a reconstructed frame.

Pixel value for frame $x(m, n) = (W_0 * F_n(m-3, n)) + (W_1 * F_n(m-2, n)) + (W_2 * F_n(m-1, n)) + (W_3 * F_n(m, n)) + (W_4 * F_{n-1}(m-3, n)) + (W_5 * F_{n-1}(m-1, n))$ Where,
n corresponds to a column;
m corresponds to a row;
$F_n$ corresponds to a pixel value (e.g., RGB value(s), YUV(s), etc.) of a first field, such as a current field for example;
$F_{n-1}$ corresponds to a pixel value (e.g., RGB value(s), YUV(s), etc.) of a second field, such as a prior field for example;
$W_i$ corresponds to a weight or weighting factor; and,
Where the sum of the weights is equal to one.

While a certain number of components are shown in FIG. 2, a participant device can include pre-processing, post-processing, encoding, decoding, and/or other components and/or functionality to enable participation in a video conference or other video experience.

Figure 3:
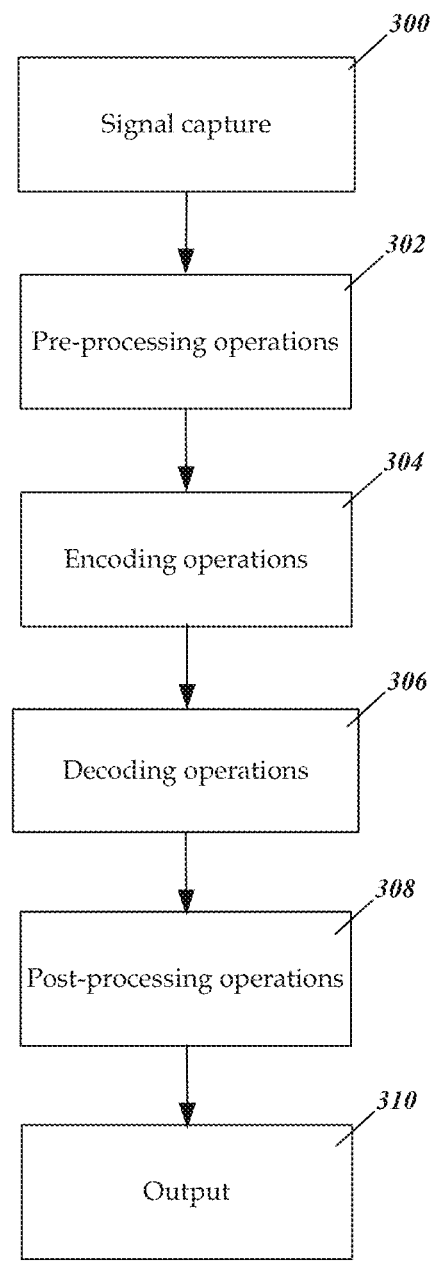
FIG. 3 is a flow diagram illustrating an exemplary process of processing a video signal.

FIG. 3 is a flow diagram which illustrates an exemplary process of processing a video signal. For example, the flow can be used to provide a video stream to one or more participants of a video conference. The components of FIG. 2 are used in the following description, but the process is not so limited. For example, a participant can use a video conferencing device, such as a laptop, desktop, handheld, or other computing device and a video camera (whether integral or external) to capture frames of pixel data at some frame rate associated with a video conferencing environment.

In an embodiment, a video camera or other optical device can be wirelessly coupled or directly wired to a computing device and used to capture information associated with a video conferencing environment to provide a captured signal at 300. At 302, the pre-processor 202 can operate to process captured frames of pixel data to provide a pre-processed signal 206. In one embodiment, for each captured frame, the pre-processor 202 can operate to discard a group of pixels (e.g., all even rows of pixels, all odd rows of pixels, etc.) to produce a field of pixel data. For example, the pre-processor 202 can operate to discard all odd rows of pixel data to produce an even field of pixel data consisting of the remaining even rows of pixel data (see operation 400 of FIG. 4).

Figure 4:
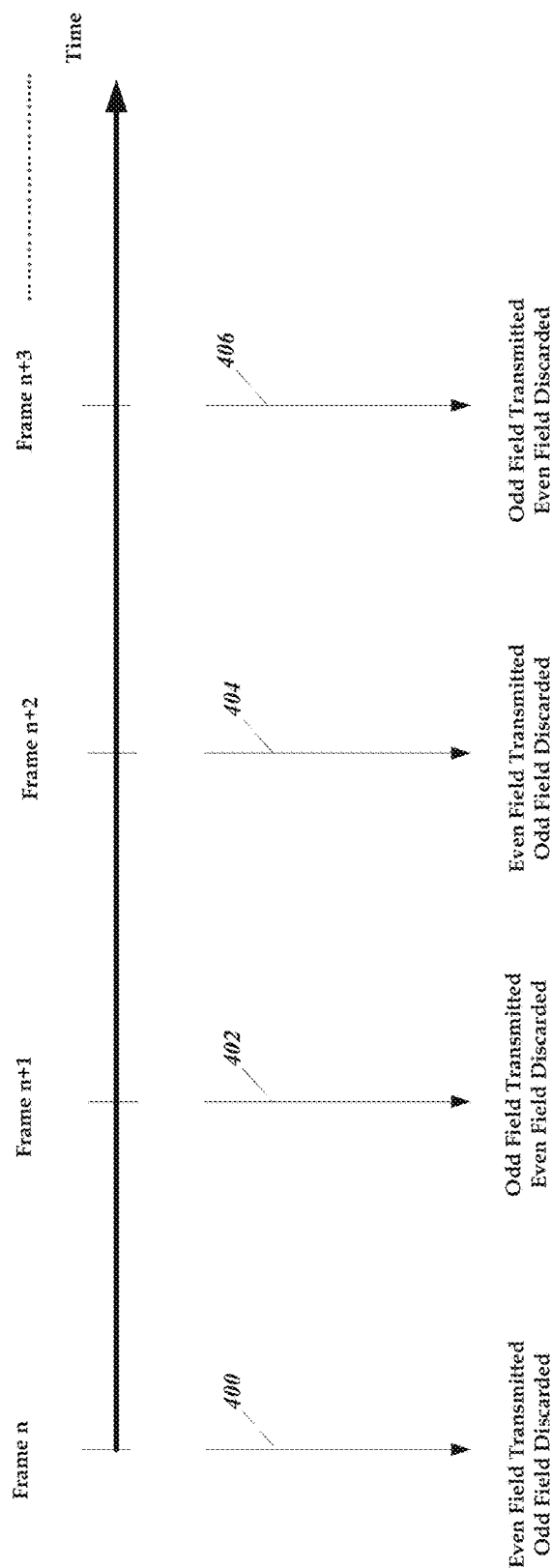
FIG. 4 illustrates an exemplary output of a pre-processor.

According to this example, for the next frame (frame (n+1) of FIG. 4), the pre-processor 202 can operate to discard all even rows of pixel data to produce an odd field of pixel data consisting of the remaining odd rows of pixel data (see operation 402 of FIG. 4). The post-processor 220 continues to process each frame accordingly (see operations 400, 406, etc. of FIG. 4). As shown, in FIG. 4, and in accordance with one embodiment, the pre-processor 202 can be configured to alternatively produce odd an even fields of pixel data from corresponding frames of pixel data, for encoding and transmitting over a communication channel.

At 304, the pre-processed signal can be communicated to an encoder 208 for encoding operations. For example, the encoder 208 can include functionality to perform quantization/de-quantization operations, compression operations, motion estimation operations, transform/inverse transform operations, de-blocking operations, prediction operations, variable-length and/or other coding operations, etc. At 306, the encoded signal provided by the encoder 208 can be decoded by a decoder 214 to produce a decoded signal 218. For example, an encoded signal associated with a video conference can be communicated over a communication channel to a video conference device of a conference participant for decoding and/or post-processing operation.

At 308, and in accordance with an embodiment, the post-processor 220 can receive a decoded signal 218 and use a first group of pixels associated with a first field of pixel data and a second group of pixels associated with a second field of pixel data to reconstruct a frame of pixel data that is associated with a captured frame of pixel data. As described above, and in accordance with one embodiment, the post-processor 220 can provide a reconstructed frame by using consecutive fields of pixel data and/or weighting factors to estimate certain pixel values for the reconstructed frame. The post-processor 220 can use motion vector and other information to determine weights or weighting factors that can be used when calculating pixel values for the reconstructed frame. At 310, the post-processor 220 can operate to provide an output signal consisting of reconstructed frames of pixel data from the processed fields of pixel data which can be displayed on an associated display.

Figure 5A:
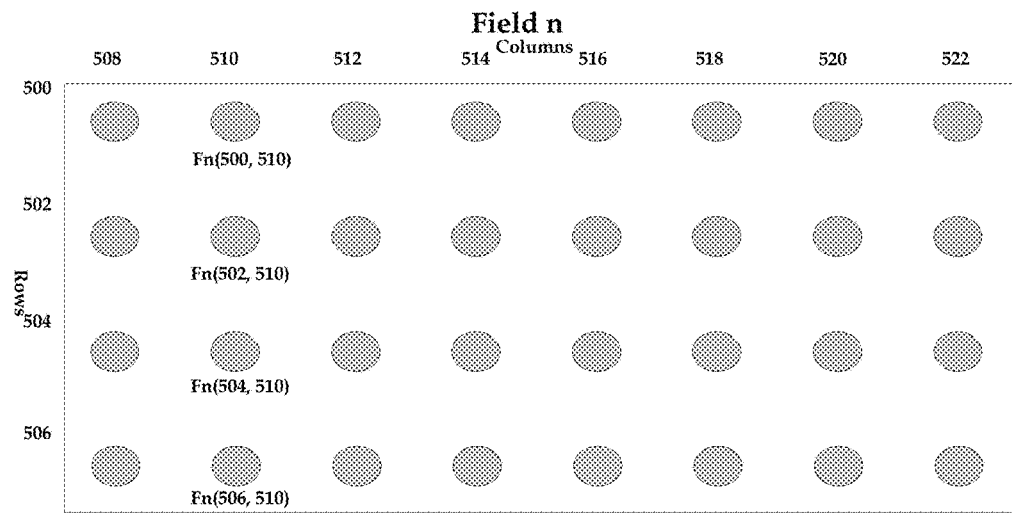
FIGS. 5A-5C graphically illustrate aspects of exemplary pixel data used as part of a frame reconstruction process.
Figure 5B:
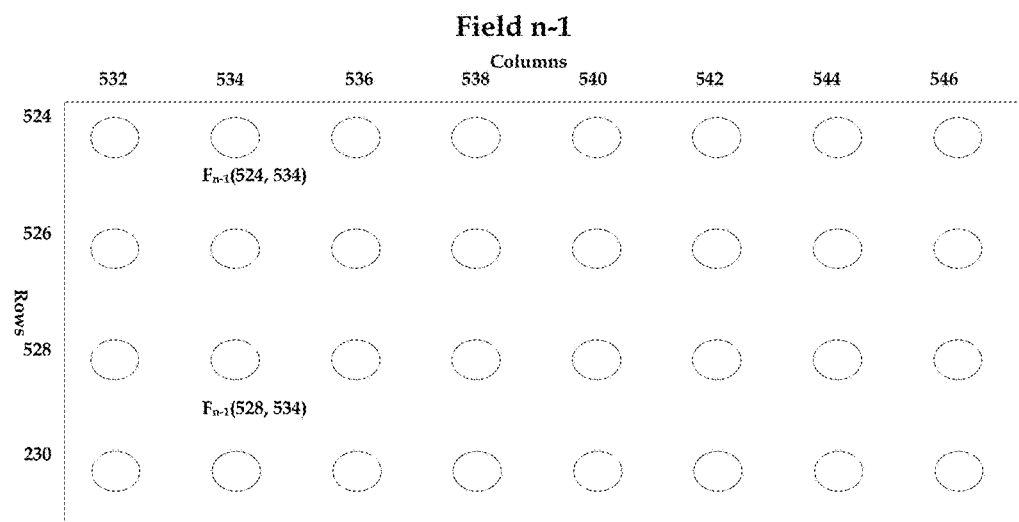
Figure 5C:
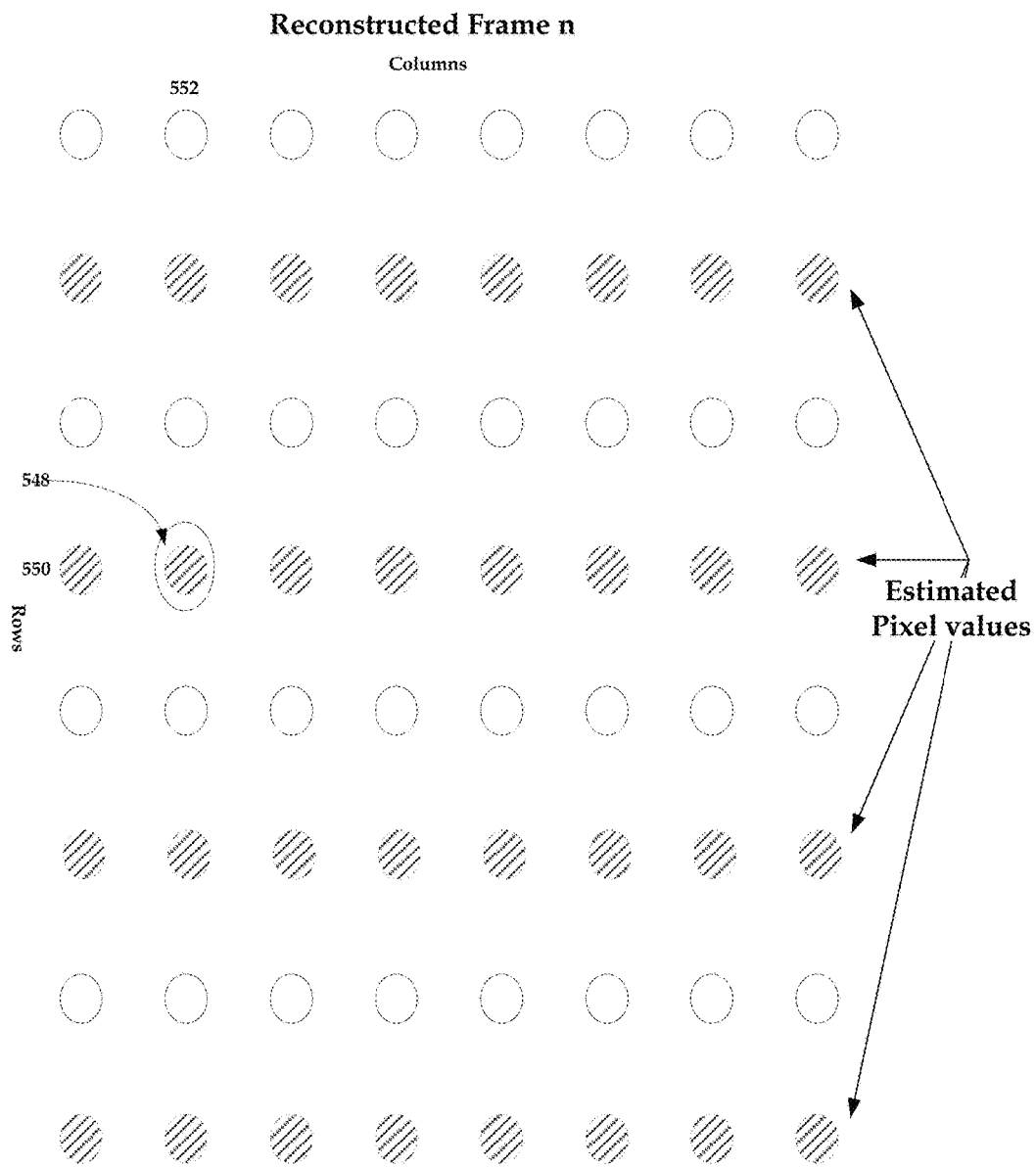

FIGS. 5A-5C graphically illustrate aspects of exemplary pixel data used as part of a frame reconstruction process. As shown in FIG. 5A, field (n) includes four rows 500-506 and eight columns 508-522 of pixel data. Likewise, as shown in FIG. 5B, field (n−1) includes four rows 524-530 and eight columns 532-546 of pixel data. Thus, information of each 4×8 field can be used to reconstruct a 8×8 frame, shown in FIG. 5C. Moreover, fewer encoding operations can be required on the front end since a captured frame of pixel data has been effectively halved. Additionally, bandwidth constraints can be compensated for since less pixel data is being transmitted with each encoded field.

Assume for this example that field (n) is the current field which includes pixel data associated with odd rows of a captured frame and field (n−1) is the previous field which includes pixel data associated with even rows of a captured frame. Also, for this example assume a post-processing component is operating to determine a value for a pixel 548 located in the fourth row 550 and second column 552 of the reconstructed frame (n). Since field (n) is the current field, the post-processing component can estimate values for pixels of even rows of the reconstructed frame (n).

According to an embodiment, the post-processing component can use pixel data associated with certain pixels of column 510 (the second column) of frame (n) in conjunction with pixel data associated with certain pixels of column 534 (the second column of frame (n−1)) to calculate a pixel value for pixel 548 of the reconstructed frame (n). According to one embodiment, the post-processing component can use pixel data associated with designated pixels (rows 500-506 for this example) in column 510 of frame (n) in conjunction with pixel data associated with certain pixels of column 534 (pixel data in rows 524 (the first row of the previous field) and 528 (the third row of the previous field)) to calculate a pixel value for pixel 548 in row 550 (the fourth row) and column 552 (the second column) of the reconstructed frame (n). Stated differently, for such an embodiment, the post-processing component can use adjacently disposed pixel data of a prior field in conjunction with pixel data of a current field that is adjacently disposed to the adjacently disposed pixel data of the prior field to provide a reconstructed frame of pixel data.

For example, the following equation can be used to calculate a value for the pixel 548 of the reconstructed frame (n):

Estimated pixel value for pixel 548=$(W_0*F_n(500, 510))+(W_1*F_n(502, 510))+(W_2*F_n(504, 510))+(W_3*F_n(506, 510))+(W_4*F_{n-1}(524, 534))+(W_5*F_{n-1}(528, 354))$ Wherein the weights or weighting factor $W_0$ through $W_5$ can be based in part on motion vector information for one or more of the pixels associated with each field and $F_n$ and $F_{n-1}$ represent pixel values for a pixel located at the associated row and column of the respective field. While a certain number of pixels, rows, columns, and operation are shown and described with respect to FIGS. 5A-5C, the example is for illustrative purposes and the embodiments are not so limited.

As described above, a post-processing component can operate to reconstruct frames of pixel data associated with a video conferencing environment or some other video environment. In an alternative embodiment, and depending on the pre-processing and/or post-processing implementation, a buffer or memory location can be used to store a previously decoded field of pixel data. For this embodiment, the post-processing component can operate to reconstruct a frame of pixel data by:

1) Creating an empty frame N, wherein all frame entries are initially set to zero and the size or resolution is the same size as a captured video signal before performing pre-processing operation. For example, the empty frame can be constructed by the post-processing component to be twice the size of a received field of pixel data.
2) If the current received field is an odd field, copy the current field to odd rows of frame N, and copy the previously received field stored in memory to the even rows.
3) If the current received field is an even one, copy the current field to even rows of frame N, and copy the previously received field stored in memory to the odd rows.
4) Use the results of 2) or 3) to provide a reconstructed frame of size N.

Figure 6:
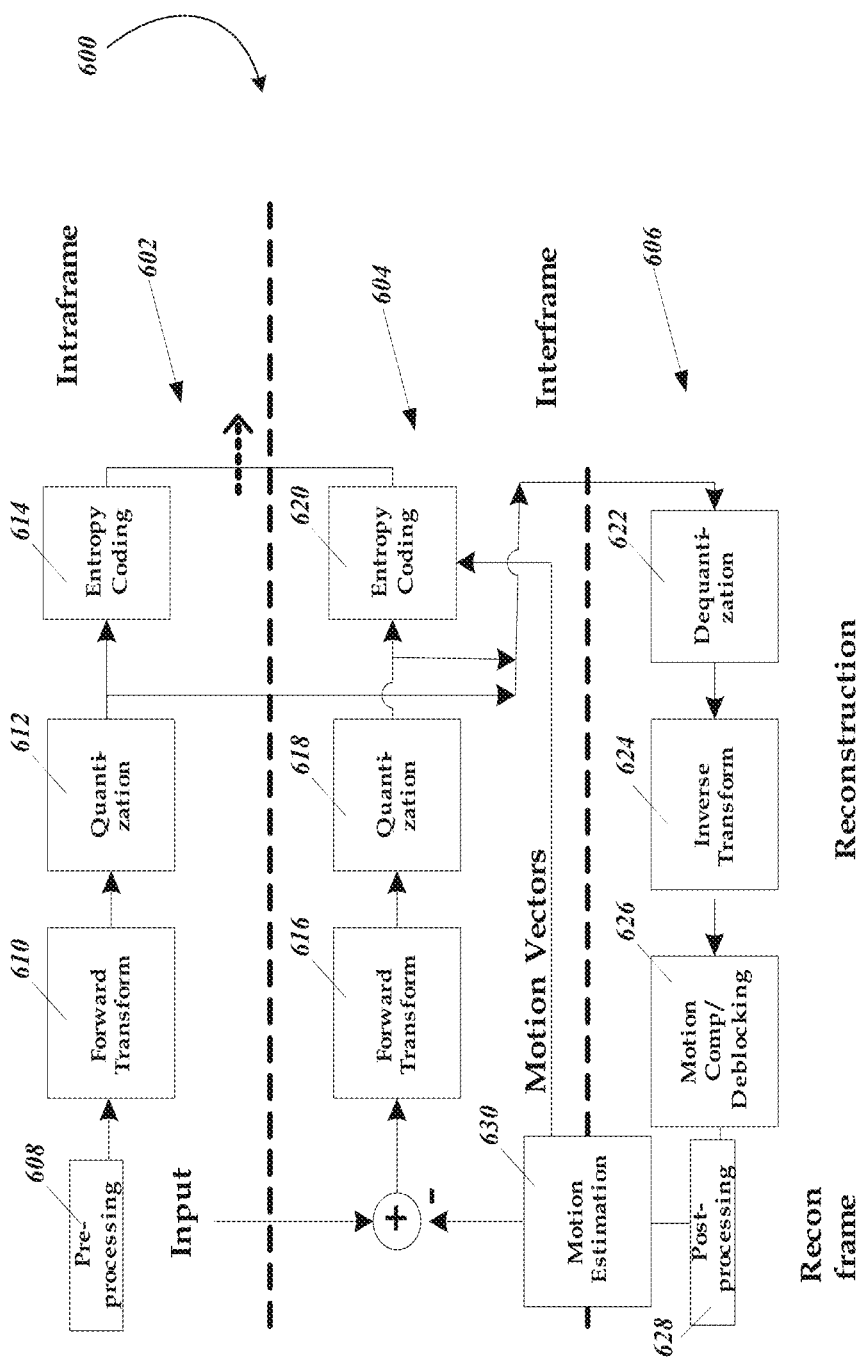
FIG. 6 is a block diagram of an exemplary video processing pipeline.

FIG. 6 is a block diagram of an exemplary video processing pipeline 600 that can be used to process a video stream or signal, but is not so limited. For example, components of video processing pipeline 600 can be used to provide a video stream to one or more participants of a video conference. Components of the video processing pipeline 600 can include pre-processing and/or post-processing functionality to compensate for bandwidth and other constraints associated with a communication network, but are not so limited.

As shown in FIG. 6, the components of the video processing pipeline 600 can operate in different operational modes. In an embodiment, components of the video processing pipeline 600 can perform intra and/or inter coding operations associated with groups of pixels of a video scene. For example, components of the video processing pipeline 600 can perform processing operations for pixel data associated with block-shaped regions of each captured frame of a video scene.

As shown in FIG. 6, and in accordance with one embodiment, components of the video processing pipeline 600 can operate according to an intraframe processing path 602, interframe processing path 604, and/or a reconstruction processing path 606 according to a desired implementation. The intraframe processing path 602 can include a pre-processing component 608, a forward transform component 610, a quantization component 612, and an entropy coding component 614. The interframe processing path 604 can include a forward transform component 616, a quantization component 618, and an entropy coding component 620. In an embodiment, certain components can include the same or similar functionalities.

The reconstruction processing path 606 can include a de-quantization component 622, an inverse transform component 624, a motion compensation/de-blocking component 626, a post-processing component 628, and a motion estimation component 630, but is not so limited. As shown in FIG. 6, the functionality of the motion estimation component 630 can be shared by components of the reconstruction processing path 606 and the interframe processing path 604. The motion estimation component 630 can operate to provide one or more motion vectors associated with a captured video scene that can be used to estimate one or more weights or weighting factors for use in estimating pixel data of a reconstructed frame associated with the captured video scene.

The components of the intraframe processing path 602 can operate to provide access points to a coded sequence where decoding can begin and continue correctly. As shown in FIG. 6, tuning and other data can be input into the summing component to further enhance the processing operations. Intracoding operations can include various spatial prediction modes to reduce spatial redundancy in a source signal associated with the video scene. Components of the interframe processing path 604 can use intercoding operations (e.g., predictive, bi-predictive etc.) on each block or other group of sample pixel values from a previously decoded video signal associated with a captured video scene. Intercoding operations can use motion vectors for block or group based inter prediction to reduce temporal redundancy.

Prediction can be based in part on a de-blocking filtered signal associated with previous or prior reconstructed frame. A de-blocking filter can be used to reduce blocking artifacts at block boundaries. In various embodiments, motion vectors and intra prediction modes can be specified for a variety of block or group sizes. A prediction residual can be further compressed using a transform to remove spatial correlation in the block or group before quantization operations. Motion vectors and/or intra prediction modes can combined with quantized transform coefficient information and encoded using entropy code such as context-adaptive variable length codes (CAVLC), Huffman codes, and other coding techniques.

Figure 7:
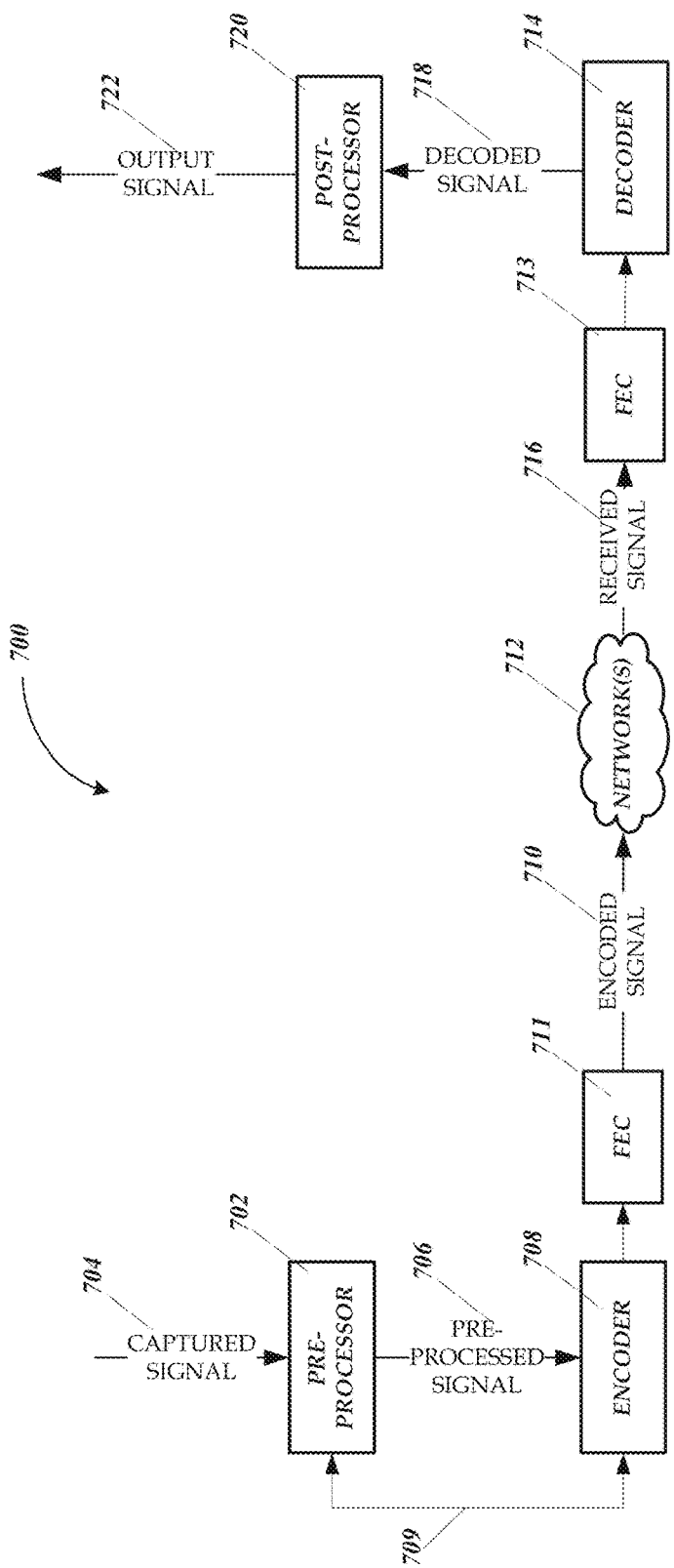
FIG. 7 is a block diagram illustrating an exemplary video conferencing system.

FIG. 7 is a block diagram depicting components of an exemplary video conferencing system 700. According to an embodiment, and as shown in FIG. 7, the system 700 includes a pre-processor 702 that can be configured to process pixel data associated with a captured signal 704, such as a real-time capture of a video scene for example. For example, a stand-alone video camera can be used to capture a video scene associated with a video conferencing environment and output a captured signal which consists of frames of pixel data (e.g., capture rate of 15 frames/sec, 30 frames/sec, etc.). Accordingly, each frame includes a number of pixels having associated pixel values. A video conferencing device (see FIG. 1) can include an associated video capture device and other video processing components that can operate to capture video and provide frames of pixel data.

The pre-processor 702 can operate to process the captured pixel data to provide a pre-processed signal 706 to an encoder 708, but is not so limited. In one embodiment, the pre-processor 702 can include a scaling component that can be used to scale down a frame of pixel data associated with a captured video scene in accordance with quality of service (QOS) and/or other features associated with a communication environment. The scaling component can operate to use information associated with a communication environment to scale certain parameters of a frame of pixel data (e.g., a video image) to be included in a video packet. For example, the pre-processed signal 706 can be encoded to include scaling parameters and other processing information associated as part of providing a video packet or payload to one or more participant devices.

In one embodiment, the scaling component can include a scaling function that can be used to scale down a frame of pixel data associated with a video packet in accordance with defined features of a communication environment (e.g., a QOS level, etc.). In another embodiment, the functionality of the pre-processor 702 can be included with the encoder 708 or some other component(s) (e.g., part of the signal capture device, etc.). As described below, and in accordance with one embodiment, the system 700 can include a post-processor 720 that includes a scaling component that can be used to re-size or re-scale a frame of pixel data of a received video signal that has been scaled before transmission.

As described below, and in accordance with various embodiments, components of the system 700 can operate to provide a QOS level to communication participants, but is not so limited. For example, components of the system 700 can operate to process a captured video signal associated with a video conference environment and provide the processed signal to one or more video conference participants, while requiring fewer encoding operations to process pixel data since a captured frame of pixel data can be effectively reduced or scaled to reduce the amount of pixels to be encoded and transmitted. Additionally, as described below, a desired processing bit rate, delay, packet loss probability, and/or bit error rate can be controlled by using features of the system 700. For example, components of the system 700 can be used to control a desired packet loss ratio for real-time or near real-time communications if a network capacity is limited by using scaled down frames of pixel data in conjunction with payload protection features for an encoded frame of pixel data.

As described above, the pre-processor 702 can be configured to scale a frame of pixel data to obtain a reduced frame of pixel data. For example, the pre-processor 702 can use a scaling function to scale a group of pixels of a frame of pixel data by a scaling factor to obtain a scaled frame of pixel data. Different scaling factors can be used to scale different aspects of a captured frame of pixel data (e.g., horizontal and/or vertical dimensions) to thereby reduce a number of processing operations of the encoder 708 when processing the pre-processed signal 706. The pre-processor 702 can operate to scale a frame of captured pixel data to provide a scaled frame of pixel data to be used for further processing and transmission operations. As one result of the pre-processor 702 operations, the amount of pixel data can be reduced by some amount (e.g., 75%, 50%, 25% etc.) in accordance with the amount of scaling used to scale a captured frame of pixel data. As a result, the encoder 708 does not have to process as much pixel data of a scaled frame of pixel data as compared to a captured frame of pixel data.

In one embodiment, the system 700 can include a feedback loop 709 that can be used to adaptively adjust to varying network and/or interactive conditions. The feedback loop 709 can be used to provide information to/from the encoder 708 (or one or more associated components (see FIG. 9 for example)) and to/from the pre-processor 702 as part of processing video data. For example, the pre-processor 702 can use rate control feedback provided by the encoder 708 to determine a scaling factor to use before applying the scaling factor to scale a width and/or height dimension of a frame of pixel data (e.g., width×height, etc.) to obtain a scaled frame of pixel data (e.g., (width/scaling factor)×(height/scaling factor), etc.). Correspondingly, scaling and/or encoding operations can be used to reduce the amount of pixel data to be processed which can assist in compensating for certain network conditions and/or processing issues.

After pre-processing operations, the pre-processed signal 706 can be communicated to the encoder 708 and/or other component(s) for further processing. The encoder 708 can operate to encode the pre-processed signal 706 according to a desired encoding technique (e.g., VC-1, H261, H264, MPEG et al., etc.). A forward error correction (FEC) component 711 can be used to append one or more protection packets to the encoded signal 710. Protection packets can be used to control a level of QOS. For example, 10 protection packets can be appended to a payload of 1000 packets to control the level of QOS (e.g., 1% packet loss ratio) for a particular video conference environment.

After appending a desired number of protecting packets, the encoded signal 710 can be communicated over a communication medium, such as a communication channel of a communication network 712 to one or more conferencing participants. At the receiving side, a FEC component 713 can be used to ensure that the received signal 716 is not corrupt and a decoder 714 can operate to decode the received signal 716. For example, a checksum technique can be used to guarantee the integrity of the received signal 716. The decoder 714 uses decoding operations to decode the received signal 716 based in part on the type of encoding operations performed by the encoder 708. As shown in FIG. 7, the decoder 714 outputs a decoded signal 718 which can be input to a post-processor 720. In one embodiment, the functionality of the post-processor 720 can be included with the decoder 714 or some other component(s).

The post-processor 720 can operate to process the decoded signal 718 to provide a post-processed signal 722 based in part on scaling and other information included in the decoded signal 718. The post-processed signal 722 can be stored in some dedicated storage or provided to a display device for display as part of a real-time video conference. The post-processor 720 can be used to reconstruct a frame of pixel data by re-scaling or re-sizing pixel data of a video image to a previous scale or size to provide a reconstructed frame of pixel data. In one embodiment, the post-processor 720 can operate to scale decoded pixel data associated with a video scene by using the same scaling factor and the associated dimension(s) as used by the pre-processor 702. For example, the post-processor 720 can use a decoded scaling factor to scale a width and/or height dimension of pixel data to reconstruct a frame of pixel data which can be displayed in real-time on an associated display.

While a certain number of components are shown in FIG. 7, a participant device can include pre-processing, post-processing, encoding, decoding, and/or other components and/or functionality to enable real-time or near real-time participation in a video conference or other video experience.

Figure 8:
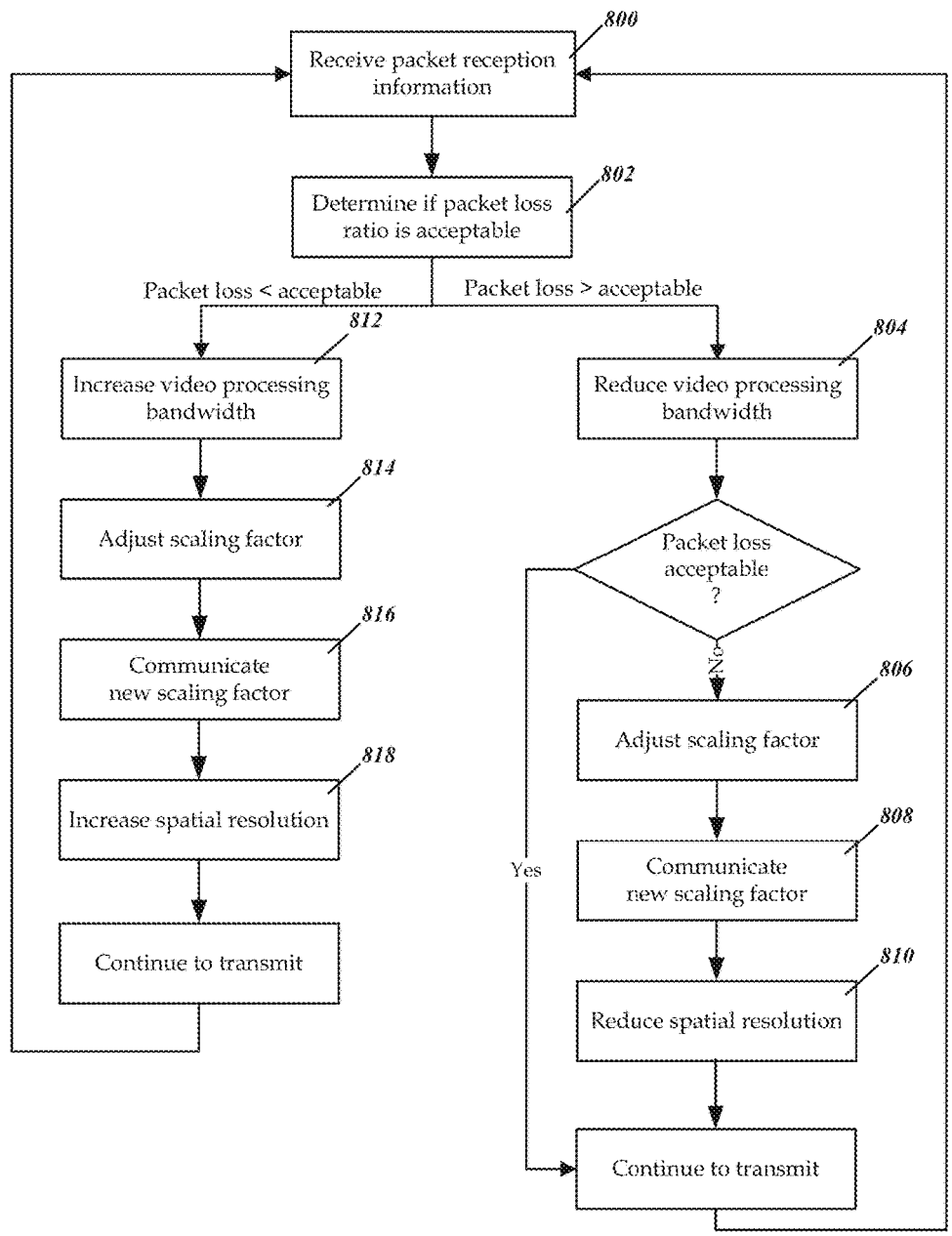
FIG. 8 is a flow diagram illustrating an exemplary process of processing a video signal.

FIG. 8 is a flow diagram which illustrates an exemplary process of processing a video signal. For example, the flow can be used to provide a video stream to one or more participants of a video conference. For example, a participant can use a video conferencing device, such as a laptop, desktop, handheld, or other computing device and a video camera (whether integral or external) to capture frames of pixel data at some frame rate associated with a video conferencing environment. As described below, the captured frames of pixel data can be processed further and transmitted to one or more communication participants.

In an embodiment, a video camera or other optical device can be wirelessly coupled or directly wired to a computing device and used to capture information associated with a video conferencing environment to provide a captured signal. As described above, the captured signal can be pre-processed, encoded, and/or transmitted to video conference device of a conference participant. In one embodiment, a network monitor component can operate to evaluate the number of packets lost during a period of time while communicating the captured signal over a network.

The lost packets may be due to a network condition or some other issue. In an alternative embodiment, a reporting component of a video conference device can be configured to create and issue a report that includes information associated with a number of packets received during an amount of time (e.g., a transmission or reception period, etc.). The information can be communicated and used by a transmitting device to determine a packet loss ratio and/or other issues associated with a number of packets transmitted during the amount of time. The packet loss ratio can be used to adjust certain communication parameters, as described below.

For the example flow of FIG. 8, assume that a participant is using a video conference device to receive a captured signal and a component of the video conference device has issued a report that includes packet loss and other information to a transmitting video conference device. As briefly described above, a network monitor can also be used to monitor network conditions, including packet losses, bandwidth constraints, and other issues. For this example, assume that the packet loss ratio should not drop below a defined range or threshold of packet loss ratios, wherein the packet loss ratio can be defined as a number of received packets divided by the number of transmitted packets during some period of time.

Assume for this example that 1000 packets have been transmitted during an amount of time, wherein 10 packets are transmitted for each encoded frame of pixel data. As described above, each packet can include information (see FIGS. 10A-10C), such as scaling, size, and other information that may have been used to scale a frame of pixel data to account for certain network conditions. In accordance with one embodiment, the information can include a scaling factor or factors for scaling one or more both of a height and a width dimension of the frame of pixel data, wherein the resized frame of pixel data includes fewer pixels.

At 800, and in accordance with an embodiment, the transmitting video conference device receives a report from a receiving video conference device or from a network monitor that includes the number of packets actually received during an amount of time. At 802, an encoder of the transmitting video conference device can use information in the report to determine if a packet loss ratio is within an acceptable range of packet loss ratios (e.g., 3-6%, etc.) or above a certain packet loss ratio (e.g., greater than 5%, etc.) that can be used to provide a certain QOS to conference participants. An acceptable range of packet loss ratios or a threshold packet loss ratio can be implemented to provide a desired QOS. For example, certain conference participants may not require a crisp signal, while others may require a high quality interactive video experience.

At 804, if the packet loss ratio is not within the accepted range of packet loss ratios or greater than an acceptable packet loss ratio, the transmitting video conference device can use encoding features to bring the packet loss ratio within the acceptable range or equal to or below the acceptable packet loss ratio. In one embodiment, the encoder can operate to reduce an assigned processing bandwidth to thereby process a signal with fewer processing operations before transmitting additional encoded packets over a communication channel.

For example, if the packet loss ratio is not within an acceptable range of packet loss ratios, the encoder can increase a quantization factor to limit the amount of processing samples provided by a quantization component when quantizing a captured signal. Alternatively, or in conjunction with increasing the quantization factor, the encoder can take processing bandwidth away from other encoding components in attempting to improve the packet loss ratio and/or maintain a processing bandwidth. For example, the encoder can adjust quantization operations, compression operations, motion estimation operations, transform operations, de-blocking operations, prediction operations, variable-length and/or other coding operations, etc.

At 806, the transmitting video conference device can use a scaling component to adjust a scaling factor (e.g., increase the scaling factor) to maintain an adjusted video processing bandwidth if the packet loss ratio is still not within the acceptable range of packet losses. Accordingly, the scaling factor can be used to control the resolution available to video conference recipients while also affecting an amount of available video processing operations. In an embodiment, the scaling factor can be used to scale a height and/or width aspects of a captured video frame. For example, a scaling factor can be used to reduce a captured frame of pixel data by some percentage (e.g., 10%, 50%, etc.) resulting in fewer pixels. Accordingly, fewer encoding operations will be required for the reduced amount of pixel data.

However, if the packet loss ratio is within the acceptable range, the flow returns to 800 and the transmitting video conference device waits for the next packet loss report. Alternatively, the transmitting video conference device can use the scaling component to adjust a scaling factor to maintain the increase in the video processing bandwidth and thereby provide an increased number of video processing operations per pixel. At 808, the transmitting video conference device communicates the new scaling factor to a receiving video conference device. The new scaling factor can be included as part of a communicated packet parameter. Alternatively, the transmitting video conference device can communicate the scaled height and/or width values associated with a particular frame and/or packet. At 810, the transmitting video conference device can use a scaling component to reduce a spatial resolution of a frame of pixel data in accordance with the new scaling factor, continue to transmit using the new spatial resolution, and the flow returns to 800.

If the packet loss is less than the acceptable range of packet losses or less than the acceptable packet loss ratio, the encoder of the transmitting video conference device can increase the video processing bandwidth at 812. For example, if the packet loss ratio is less than an acceptable range of packet loss ratios, the encoder can decrease a quantization factor to increase an amount of processing samples provided by a quantization component when quantizing a captured signal. At 814, the transmitting video conference device can use the scaling component to adjust the scaling factor (e.g., decrease the scaling factor) to maintain the recently increased video processing bandwidth. Accordingly, a greater pixel resolution will be available to video conference recipients. At 816, the transmitting video conference device communicates the new scaling factor to a receiving video conference device.

As described above, the new scaling factor can be included as part of a packet parameter. Alternatively, the transmitting video conference device can communicate scaled height and/or width values associated with a particular frame and/or packet to a participant device or devices. At 818, the transmitting video conference device can use the scaling component to increase the spatial resolution of a frame of pixel data in accordance with the new scaling factor, continue to transmit using the new spatial resolution, and the flow again returns to 800.

Figure 9:
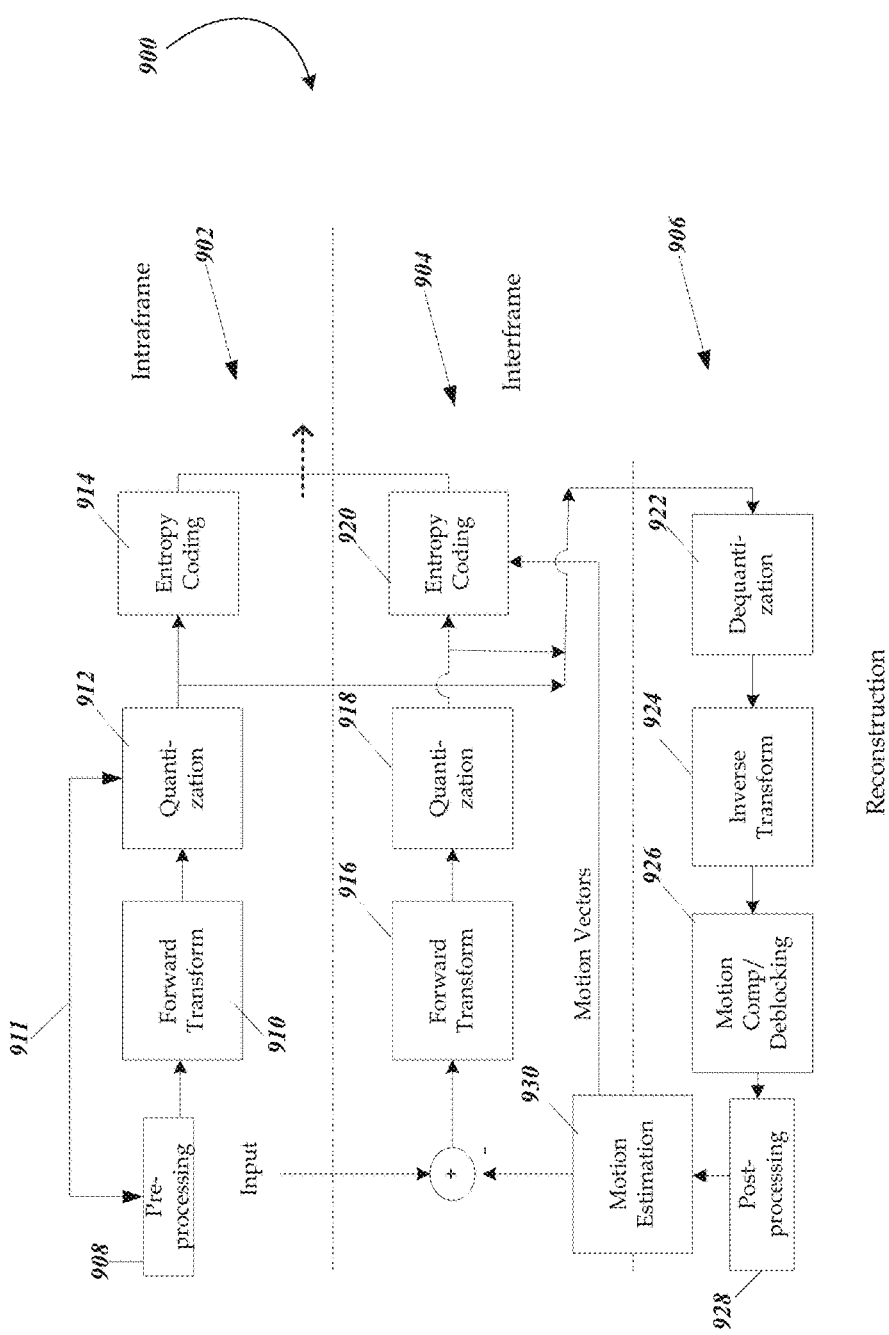
FIG. 9 is a block diagram of an exemplary video processing pipeline.

FIG. 9 is a block diagram of an exemplary video processing pipeline 900 that can be used to process a video stream or signal, but is not so limited. For example, components of video processing pipeline 900 can be used to provide a video stream to one or more participants of a video conference. Components of the video processing pipeline 900 can include pre-processing and/or post-processing functionality that can be used in conjunction with other processing features to compensate for conditions and issues associated with a communication network, but are not so limited.

As shown in FIG. 9, the components of the video processing pipeline 900 can operate in different operational modes. In an embodiment, components of the video processing pipeline 900 can perform intra and/or inter coding operations associated with groups of pixels of a video scene. For example, components of the video processing pipeline 900 can perform processing operations for pixel data associated with block-shaped regions (e.g., macroblocks or some other grouping of pixels) of each captured frame of a video scene.

As shown in FIG. 9, and in accordance with one embodiment, components of the video processing pipeline 900 can operate according to an intraframe processing path 902, interframe processing path 904, and/or a reconstruction processing path 906 according to a desired implementation. The intraframe processing path 902 can include a pre-processing component 908, a forward transform component 910, a quantization component 912, and an entropy coding component 914. In an embodiment, the pre-processing component 908 can be configured as a scaling component that includes a scaling function to scale pixel data. For example, the scaling component can operate to scale a frame of pixel data using a scaling factor to provide a scaled frame size, wherein the scaled frame includes fewer pixels and/or pixel data than a captured frame of pixel data.

In one embodiment, the pipeline 900 can include a feedback loop 911 that can be used to adaptively adjust to varying interactive communication conditions. Information can be communicated using the feedback loop 911 to control the operation of one or more video processing a components. For example, the pre-processing component 908 can use quantization feedback provided by the quantization component 912 to adjust a scaling factor to use before using the scaling factor to scale a frame of captured pixel data to obtain a scaled frame of pixel data (e.g., (number of horizontal pixels/scaling factor) and/or (number of vertical pixels/scaling factor), etc.). Correspondingly, scaling and/or encoding operations can be used to reduce the amount of pixel data to be processed which can assist in compensating for certain communication conditions and/or processing issues which may be affecting an interactive video environment.

The interframe processing path 904 can include a forward transform component 916, a quantization component 918, and an entropy coding component 920. As shown in FIG. 9, tuning and other data can be input into the summing component to further enhance the processing operations. In an embodiment, certain components can include the same or similar functionalities. Moreover, functionalities of one or more components can be combined or further divided. The reconstruction processing path 906 can include a de-quantization component 922, an inverse transform component 924, a motion compensation/de-blocking component 926, a post-processing component 928, and a motion estimation component 930, but is not so limited.

In one embodiment, the post-processing component 928 can be configured as a scaling component that includes a scaling function to scale pixel data, wherein the scaling function is an inverse of the scaling function used by the pre-processing scaling component. For example, the post-processing scaling component can operate to scale a frame of pixel data from a first scaled frame size to a second scaled frame size, wherein the second scaled frame has the same height and/or width dimensions as a captured frame.

As shown in FIG. 9, the functionality of the motion estimation component 930 can be shared by components of the reconstruction processing path 906 and the interframe processing path 904. The motion estimation component 930 can operate to provide one or more motion vectors associated with a captured video scene that can be used to estimate one or more factors for use in estimating pixel data of a reconstructed frame associated with the captured video scene. The components of the intraframe processing path 902 can operate to provide access points to a coded sequence where decoding can begin and continue correctly, but are not so limited.

Intracoding operations can include various spatial prediction modes to reduce spatial redundancy in a source signal associated with a video scene. Components of the interframe processing path 904 can use intercoding operations (e.g., predictive, bi-predictive etc.) on each block or other group of sample pixel values from a previously decoded video signal associated with a captured video scene. Intercoding operations can use motion vectors for block or group based inter prediction to reduce temporal redundancy.

Prediction can be based in part on a de-blocking filtered signal associated with previous or prior reconstructed frame. A de-blocking filter can be used to reduce blocking artifacts at block boundaries. In various embodiments, motion vectors and intra prediction modes can be specified for a variety of block or group sizes. A prediction residual can be further compressed using a transform to remove spatial correlation in the block or group before quantization operations. Motion vectors and/or intra prediction modes can combined with quantized transform coefficient information and encoded using entropy coding techniques FIGS. 10A-10C depict exemplary video packet architectures. FIG. 10A depicts an exemplary real time video basic Real time Transfer Protocol (RTP) payload format. FIG. 10B depicts an exemplary real time video extended RTP payload format. FIG. 10C depicts an exemplary payload that includes FEC protection features.

The following definitions apply to FIGS. 10A-10C:
- M (1 bit): Payload format mode. This field is set to 0 to in the RTVideo Basic RTP Payload Format mode (FIG. 9A). The field is set to 1 in other RTP payload formats.
- C (1 bit): Cached frame flag. A value of 1 specifies a cached frame. A value of 0 specifies the frame is not a cached frame. The decoder on the receiver side can cache the cached frame due to the fact that the next SP-frame references it.
- SP (1 bit): Super P (SP) frame flag. A value of 1 specifies an SP-frame. A value of 0 specifies the frame is not an SP-frame.
- L (1 bit): Last packet flag. Indicates whether this packet is the last packet of the video frame, excluding FEC metadata packets. A value of 1 specifies the last packet. A value of 0 specifies it is not the last packet.
- O (1 bit): set to 1.
- I (1 bit): I-frame flag. Indicates whether the frame is an I-frame. A value of 1 indicates the frame is an I-frame. A value of 0 indicates it is an SP-frame, P-frame, or B-frame.
- S (1 bit): Sequence header presence flag. Indicates the presence of the SequenceHeader. A value of 1 indicates the SequenceHeaderSize field is present. A value of 0 indicates the SequenceHeaderSize field is not present.
- F (1 bit): First packet flag. Indicates whether the packet is the first packet of the video frame. A value of 1 indicates the packet is the first packet. A value of 0 indicates it is not the first packet.
- SequenceHeader Length (e.g., 8 bits): The size of sequence header bytes field. Only present when the SequenceHeaderPresent bit is 1. The value of this field MUST be less than or equal to 63.
- Sequence Header Bytes (variable length): Sequence header. Only present when the S bit is 1 and the sequence header length is greater than 0. The size is indicated by the sequence header length field. The sequence header can include a scaled frame size, scaling factor(s), height parameters, width parameters, and/or other information that can be used by a post-processor or other component.

Figure 11:
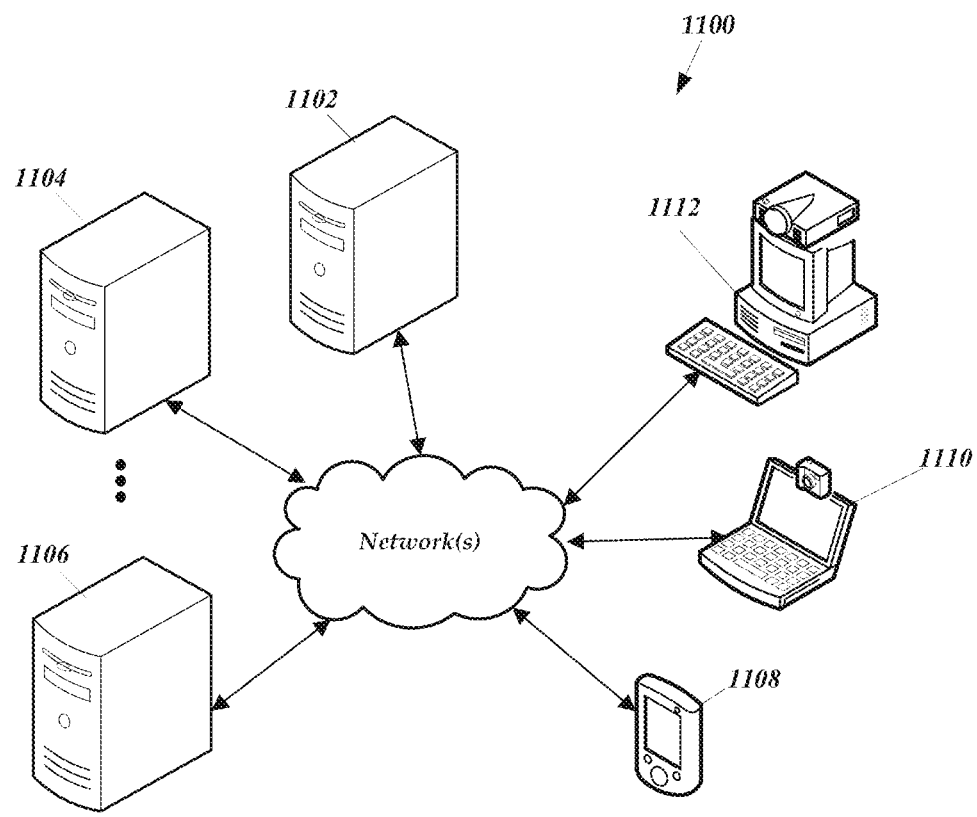
FIG. 11 illustrates an exemplary networked environment.

FIG. 11 is an example networked environment 1100, where various embodiments may be implemented. Detection and augmentation operations can be implemented in such a networked environment 1100. As shown in FIG. 11, the networked environment 1100 can include a topology of servers (e.g., web server 1102, mediation server 1104, collaboration server 1106, etc.), clients, devices, Internet service providers, communication media, and/or other network/communication functionality. The networked environment 1100 can also include a static or dynamic topology. Video conferencing devices (e.g., smart phone 1108, laptop 1110, desktop 1112, etc.) can be configured with pre-processing and/or post-processing components to process aspects of a video stream as part of an interactive communication environment.

The networked environment 1100 can include a secure network such as an enterprise network, an unsecure network such as a wireless open network, the Internet, or some other network or combination of networks. By way of example, and not limitation, the networked environment 1100 can include wired media such as a wired network or direct-wired connection, and/or wireless media such as acoustic, radio frequency (RF), infrared, and/or other wireless media. Many other configurations of computing devices, applications, data sources, data distribution systems, etc. can be employed to implement browsing and other functionality. Moreover, the networked environment 1100 of FIG. 11 is included for illustrative purposes. Embodiments are not limited to the example applications, modules, devices/systems, or processes described herein.

Exemplary Operating Environment

Figure 12:
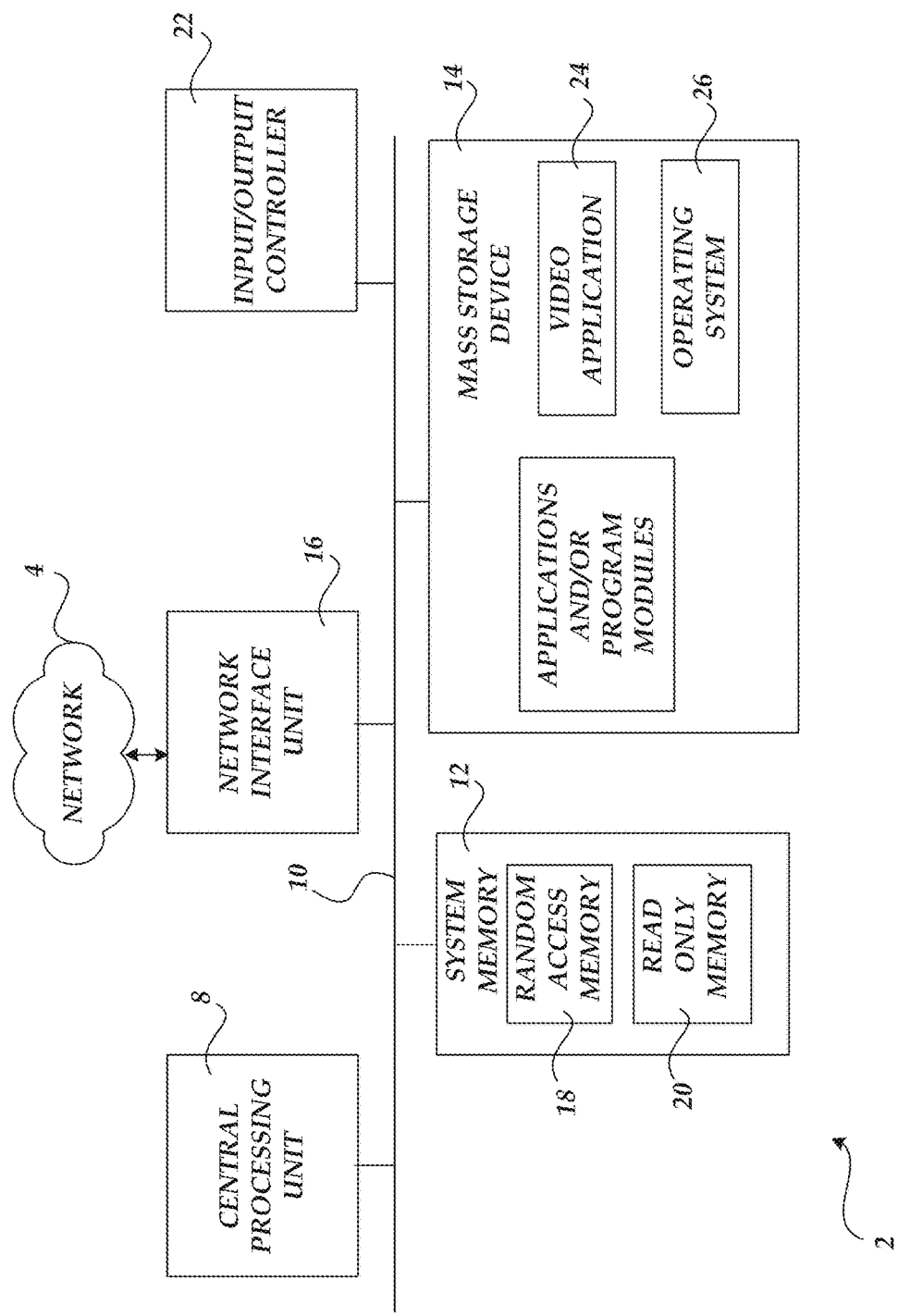
FIG. 12 is a block diagram illustrating an exemplary computing environment for implementation of various embodiments described herein.

Referring now to FIG. 12, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 12, an illustrative operating environment for embodiments of the invention will be described. Computing device 2 comprises a general purpose desktop, laptop, handheld, tablet, or other type of computer capable of executing one or more application programs. The computing device 2 includes at least one central processing unit 8 ("CPU"), a system memory 12, including a random access memory 18 ("RAM"), a read-only memory ("ROM") 20, and a system bus 10 that couples the memory to the CPU 8. A basic input/output system containing the basic routines that help to transfer information between elements within the computer, such as during startup, is stored in the ROM 20.

The computing device 2 further includes a mass storage device 14 for storing an operating system 26, application programs, and/or other program modules. The mass storage device 14 is connected to the CPU 8 through a mass storage controller (not shown) connected to the bus 10. The mass storage device 14 and its associated computer-readable media provide non-volatile storage for the computing device 2. Although the description of computer-readable media contained herein refers to a mass storage device, such as a hard disk or CD-ROM drive, it should be appreciated by those skilled in the art that computer-readable media can be any available media that can be accessed or utilized by the computing device 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing device 2.

According to various embodiments, the computing device 2 may operate in a networked environment using logical connections to remote computers through a network 4, such as a local network, the Internet, etc. for example. The computing device 2 may connect to the network 4 through a network interface unit 16 connected to the bus 10. It should be appreciated that the network interface unit 16 may also be utilized to connect to other types of networks and remote computing systems. The computing device 2 may also include an input/output controller 22 for receiving and processing input from a number of input types, including a keyboard, mouse, keypad, pen, stylus, finger, speech-based, and/or other means. Other input means are available including combinations of various input means. Similarly, an input/output controller 22 may provide output to a display, a printer, or other type of output device. Additionally, a touch screen or other digitized device can serve as an input and an output mechanism.

As mentioned briefly above, a number of program modules and data files may be stored in the mass storage device 14 and RAM 18 of the computing device 2, including an operating system 26 suitable for controlling the operation of a networked personal computing device, such as the WINDOWS operating systems from MICROSOFT CORPORATION of Redmond, Wash. for example. The mass storage device 14 and RAM 18 may also store one or more program modules. The mass storage device 14, or other storage, and the RAM 18 may store other application programs or modules, including video application 24.

Components of the systems/devices described above can be implemented as part of networked, distributed, and/or other computer-implemented and communication environments. Moreover, the detection functionality can be used in conjunction with a desktop computer, laptop, smart phone, personal data assistant (PDA), ultra-mobile personal computer, and/or other computing or communication devices to provide conferencing data. Aspects of a video conferencing system can be employed in a variety of computing/communication environments. For example, a video conferencing system can include devices/systems having networking, security, and other communication components which are configured to provide communication and other functionality to other computing and/or communication devices.

While certain communication architectures are shown and described herein, other communication architectures and functionalities can be used. Additionally, functionality of various components can be also combined, further divided, expanded, etc. The various embodiments described herein can also be used with a number of applications, systems, and/or other devices. Certain components and functionalities can be implemented in hardware and/or software. While certain embodiments include software implementations, they are not so limited and also encompass hardware, or mixed hardware/software solutions. Accordingly, the embodiments and examples described herein are not intended to be limiting and other embodiments are available.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of a computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
   determining a packet loss parameter associated with a video packet transmission based on packet reception information, wherein the packet reception information comprises a number of packets received by a video receiving device during an amount of time;
   adaptively adjusting a communication parameter based at least in part on the packet loss parameter to form an adjusted communication parameter based at least on a feedback loop between a pre-processor and an encoder, wherein the communication parameter comprises:
   a scaling factor for scaling an unencoded video signal, a video quantization factor for encoding the unencoded video signal, and
a level of payload protection for adjusting a protection level of packet loss;
pre-processing, by the pre-processor, the unencoded video signal with at least the scaling factor to form a pre-processed video signal;
encoding, by the encoder, the pre-processed video signal with at least the video quantization factor to form an encoded signal;
adjusting a protection level of packet loss on the encoded signal with at least the level of payload protection; and
transmitting the encoded signal and the adjusted communication parameter.

2. The method of claim 1, further comprising adapting a size of the video packet transmission to network conditions.

3. The method of claim 1, further comprising modifying the protection level by assigning a number of protecting bytes to the video packet transmission.

4. The method of claim 1, further comprising appending one or more protection packets to the encoded signal before transmitting the encoded signal over a communication channel.

5. The method of claim 1, wherein encoding the pre-processed video signal further comprises using one or more of range compression operations, motion estimation operations, transformation operations, quantization operations, de-blocking operations, reference operations, prediction operations, variable-length coding operations, buffer management operations, estimated distortion heuristics, quality impact techniques, and inter/intra prediction optimizations.

6. The method of claim 1, wherein the pre-processing of the unencoded video signal further comprises:
scaling a group of pixels of a frame of pixel data associated with the unencoded video signal.

7. The method of claim 1 further comprising scaling horizontal and vertical dimensions of the video signal.

8. The method of claim 1, wherein the communication parameter comprises a video processing bandwidth.

9. The method of claim 8, wherein adaptively adjusting the communication parameter further comprises:
reducing the video processing bandwidth and increasing the scaling factor when the packet loss parameter is greater than a predetermined value.

10. The method of claim 1, wherein adaptively adjusting the communication parameter further comprises:
decreasing the scaling factor when the packet loss parameter is less than a predetermined value.

11. The method of claim 1, wherein the communication parameter comprises a spatial resolution, and adaptively adjusting the communication parameter further comprises:
reducing the spatial resolution when the packet loss parameter is greater than a predetermined value.

12. A method comprising:
determining a packet loss parameter associated with a video packet transmission based on packet reception information, wherein the packet reception information comprises a number of packets received by a video receiving device during an amount of time;
adaptively adjusting a communication parameter based at least on the packet loss parameter to form an adjusted communication parameter based at least on a feedback loop between a pre-processor and an encoder, wherein the communication parameter comprises:
a scaling factor for scaling an unencoded video signal,
a video quantization factor for encoding the unencoded video signal, and
a level of payload protection for adjusting a protection level of packet loss;
pre-processing, by the pre-processor, the unencoded video signal with at least the scaling factor to form a pre-processed video signal, wherein the pre-processing further comprises pre-processing a frame of pixel data by discarding one or more of even and odd lines of the frame of pixel data to obtain a field of pixel data;
encoding, by the encoder, the pre-processed video signal with at least the video quantization factor to form an encoded signal;
adjusting a protection level of packet loss on the encoded signal with at least the level of payload protection; and
transmitting the encoded signal and the adjusted communication parameter.

13. The method of claim 12, wherein pre-processing the video signal further comprises pre-processing consecutive frames of pixel data to provide a plurality of fields of pixel data.

14. An adaptive video processing system comprising:
at least one processor;
memory storing computer executable instructions that when executed by the at least one processor cause the processor to:
determine a packet loss ratio associated with a video packet based on packet reception information, wherein the packet reception information comprises a number of packets received by a video receiving device during an amount of time;
adaptively adjust a communication parameter based at least on the packet loss ratio to form an adjusted communication parameter based at least on a feedback loop between a pre-processor and an encoder, wherein the communication parameter comprises:
a scaling factor for scaling an unencoded video signal,
a video quantization factor for encoding the unencoded video signal, and
a level of payload protection for adjusting a protection level of packet loss;
pre-process, by the pre-processor, the unencoded video signal with at least in part the scaling factor to form a pre-processed video signal;
encode, by the encoder, the pre-processed video signal with at least in part the video quantization factor to form an encoded signal;
adjust a protection level of packet loss on the encoded signal with at least in part the level of payload protection; and
transmit the encoded signal and the adjusted communication parameter to the network.

15. The adaptive video processing system of claim 14, wherein the communication parameter comprises a video processing bandwidth, and the system further comprises computer executable instructions stored in the memory that when executed by the processor cause the processor to:
reduce the video processing bandwidth when the packet loss ratio exceeds a threshold.

16. The adaptive video processing system of claim 15, wherein the communication parameter comprises a spatial resolution, and the system further comprises computer executable instructions stored in the memory that when executed by the processor cause the processor to:
reduce the spatial resolution when the packet loss ratio exceeds a threshold.

17. The adaptive video processing system of claim 14, wherein the communication parameter comprises a spatial resolution, and the system further comprises computer executable instructions stored in the memory that when executed by the processor cause the processor to:
increase the spatial resolution when the packet loss ratio is less than a threshold.

18. The adaptive video processing system of claim 14, wherein the communication parameter comprises a video processing bandwidth, and the system further comprises computer executable instructions stored in the memory that when executed by the processor cause the processor to:
increase the video processing bandwidth when the packet loss ratio is less than a threshold.

19. The adaptive video processing system of claim 14 further comprising computer executable instructions stored in the memory that when executed by the processor cause the processor to:
receive, from the network, the transmitted encoded signal and the adjusted communication parameter;
decode the received encoded signal;
post-process the decoded signal to form a post-processed video signal;
adjust the packet loss ratio based on the received encoded signal;
transmit the adjusted packet loss ratio to the network; and
display the post-processed video signal.

* * * * *